United States Patent
Kwak et al.

(10) Patent No.: US 12,272,173 B2
(45) Date of Patent: Apr. 8, 2025

(54) METHOD AND APPARATUS WITH LIVENESS TEST AND/OR BIOMETRIC AUTHENTICATION

(71) Applicant: SAMSUNG ELECTRONICS CO., LTD., Suwon-si (KR)

(72) Inventors: Youngjun Kwak, Seoul (KR); Minsu Ko, Suwon-si (KR); Youngsung Kim, Suwon-si (KR); Heewon Kim, Seoul (KR); Ju Hwan Song, Suwon-si (KR); Byung In Yoo, Seoul (KR); Seon Min Rhee, Seoul (KR); Yong-il Lee, Daejeon (KR); Jiho Choi, Seoul (KR); Seungju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/515,798

(22) Filed: Nov. 21, 2023

(65) Prior Publication Data
US 2024/0087358 A1 Mar. 14, 2024

Related U.S. Application Data

(63) Continuation of application No. 16/899,935, filed on Jun. 12, 2020, now Pat. No. 11,869,272.

(30) Foreign Application Priority Data

Nov. 21, 2019 (KR) ........................ 10-2019-0150537

(51) Int. Cl.
*G06T 7/00* (2017.01)
*G06F 21/32* (2013.01)
(Continued)

(52) U.S. Cl.
CPC ............ *G06V 40/166* (2022.01); *G06F 21/32* (2013.01); *G06T 7/0012* (2013.01); *G06T 7/73* (2017.01);
(Continued)

(58) Field of Classification Search
CPC ............ G06T 7/73; G06T 2207/10028; G06T 2207/10048; G06T 7/181; G06V 40/161; G06V 40/168
See application file for complete search history.

(56) References Cited

U.S. PATENT DOCUMENTS 10,078,886 B2    9/2018   Zach
2017/0091550 A1* 3/2017   Feng ..................... G06T 3/4061
(Continued)

FOREIGN PATENT DOCUMENTS

CN    106372615 A   2/2017
JP      5106459 B2  12/2012
(Continued)

OTHER PUBLICATIONS

Zhang, Shifeng, et al. "A dataset and benchmark for large-scale multi-modal face anti-spoofing." Proceedings of the IEEE/CVF Conference on Computer Vision and Pattern Recognition. 2019. (Year: 2019).*
(Continued)

*Primary Examiner* — Amandeep Saini
*Assistant Examiner* — Denise G Alfonso
(74) *Attorney, Agent, or Firm* — NSIP Law

(57) ABSTRACT

A processor-implemented method includes generating a preprocessed infrared (IR) image by performing first preprocessing based on an IR image including an object; generating a preprocessed depth image by performing second preprocessing based on a depth image including the object; and determining whether the object is a genuine
(Continued)

object based on the preprocessed IR image and the preprocessed depth image.

22 Claims, 13 Drawing Sheets

(51) Int. Cl.
    *G06T 7/73* (2017.01)
    *G06V 10/143* (2022.01)
    *G06V 40/16* (2022.01)
    *G06V 40/40* (2022.01)

(52) U.S. Cl.
    CPC .......... *G06V 10/143* (2022.01); *G06V 40/161* (2022.01); *G06V 40/168* (2022.01); *G06V 40/40* (2022.01); *G06T 2207/10028* (2013.01); *G06T 2207/10048* (2013.01); *G06T 2207/30201* (2013.01)

(56) References Cited

U.S. PATENT DOCUMENTS

| | | | |
|---|---|---|---|
| 2017/0180348 A1 | 6/2017 | Pccolotto et al. | |
| 2017/0278223 A1 | 9/2017 | Zach | |
| 2019/0251237 A1 | 8/2019 | Park et al. | |
| 2019/0347823 A1 | 11/2019 | Yang et al. | |
| 2019/0354746 A1* | 11/2019 | Zhang | G06V 40/171 |
| 2020/0250403 A1* | 8/2020 | Xiao | G06V 40/168 |
| 2021/0327091 A1* | 10/2021 | Park | G06F 18/25 |

FOREIGN PATENT DOCUMENTS

| | | |
|---|---|---|
| KR | 101815697 B1 * | 1/2018 |
| KR | 10-2018-0134280 A | 12/2018 |
| WO | WO 2016/107638 A1 | 7/2016 |

OTHER PUBLICATIONS

Parkin, Aleksandr, and Oleg Grinchuk. "Recognizing multi-modal face spoofing with face recognition networks." Proceedings of the IEEE/CVF conference on computer vision and pattern recognition workshops. 2019. (Year: 2019).*

Zhang, Shifeng, et al. "A dataset and benchmark for large-scale multi-modal face anti-spoofing." *Proceedings of the IEEE/CVF Conference on Computer Vision and Pattern Recognition.* 2019.

Thavalengal, Shejin, Petronel Bigioi, and Peter Corcoran. "Evaluation of combined visible/NIR camera for iris authentication on smartphones." *Proceedings of the IEEE Conference on Computer Vision and Pattern Recognition Workshops.* 2015.

Parkin, Aleksandr, and Oleg Grinchuk. "Recognizing multi-modal face spoofing with face recognition networks." *Proceedings of the IEEE/CVF conference on computer vision and pattern recognition workshops.* 2019.

EESR dated Mar. 30, 2021 issued in counterpart European Patent Application No. 20201858.6.

Zhang, Shifeng, et al. "A dataset and benchmark for large-scale multi-modal face anti-spoofing." Proceedings of the IEEE/CVF Conference on Computer Vision and Pattern Recognition. 2019 (10 pages in English).

U.S. Appl. No. 16/899,935, filed Jun. 12, 2020, Youngjun Kwak et al., Samsung Electronics Co., Ltd.

* cited by examiner

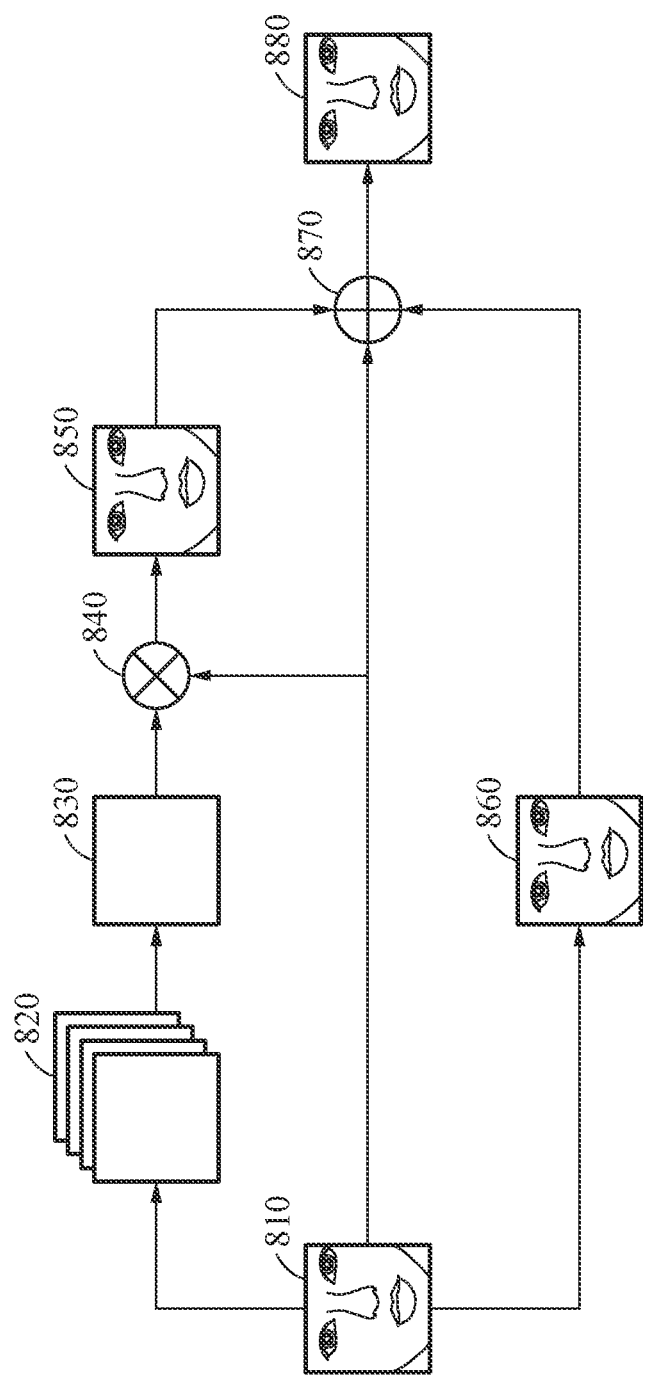

METHOD AND APPARATUS WITH LIVENESS TEST AND/OR BIOMETRIC AUTHENTICATION

CROSS-REFERENCE TO RELATED APPLICATIONS

This application is a continuation of U.S. application Ser. No. 16/899,935 filed on Jun. 12, 2020, which claims the benefit under 35 USC § 119(a) of Korean Patent Application No. 10-2019-0150537 filed on Nov. 21, 2019 in the Korean Intellectual Property Office, the entire disclosures of which are all incorporated herein by reference for all purposes.

BACKGROUND

1. Field

The following description relates to a method and apparatus with liveness test and/or biometric authentication.

2. Description of Related Art

In a user authentication system, a computing device may determine whether to allow an access to the computing device based on authentication information provided by a user. The authentication information may include a password input by the user or biometric information of the user. The biometric information may include information related to a fingerprint, an iris, and/or a face.

Face anti-spoofing technology may verify whether a face of a user input into the computing device is a fake face or a genuine face. For this, features such as Local Binary Patterns (LBP), Histogram of Oriented Gradients (HOG), and Difference of Gaussians (DoG) may be extracted from the input image, and whether the input face is a fake face may be determined based on the extracted features. Face spoofing may include attacks (or attempts to have the face anti-spoofing technology improperly determine that a fake face user input is a genuine face) using a photo, a video, or a mask.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a preprocessed infrared (IR) image by performing first preprocessing based on an IR image including an object; generating a preprocessed depth image by performing second preprocessing based on a depth image including the object; and determining whether the object is a genuine object based on the preprocessed IR image and the preprocessed depth image.

The method may include acquiring the IR image including the object and the depth image including the object.

The determining of whether the object is the genuine object may include determining whether the object is an animate object.

The generating of the preprocessed IR image may include generating the preprocessed IR image such that an edge component of the IR image is emphasized in the preprocessed IR image.

The generating of the preprocessed IR image may include generating a first intermediate image based on pixel values of a current pixel and neighboring pixels of the current pixel in the IR image; generating a second intermediate image by performing normalization on the IR image; and generating the preprocessed IR image based on the IR image, the first intermediate image, and the second intermediate image.

A pixel of the preprocessed IR image may include a pixel value of the current pixel in the IR image, a pixel value of a pixel at a corresponding position in the first intermediate image, and a pixel value of a pixel at a corresponding position in the second intermediate image.

The generating of the first intermediate image may include combining a pixel value of the current pixel in the IR image and a pixel value of a pixel at a corresponding position in a generated single-channel IR image.

The generated single-channel IR image may be generated by combining a pixel value of a pixel at the corresponding position in a first channel IR image, a pixel value of a pixel at the corresponding position in a second channel IR image, a pixel value of a pixel at the corresponding position in a third channel IR image, and a pixel value of a pixel at the corresponding position in a fourth channel IR image.

The pixel value of the pixel in the first channel IR image may be a pixel value of a pixel positioned immediately above the current pixel in the IR image, the pixel value of the pixel in the second channel IR image may be a pixel value of a pixel positioned immediately below the current pixel in the IR image, the pixel value of the pixel in the third channel IR image may be a pixel value of a pixel positioned immediately to the left of the current pixel in the IR image, and the pixel value of the pixel in the fourth channel IR image may be a pixel value of a pixel positioned immediately to the right of the current pixel in the IR image.

The generating of the preprocessed depth image may include determining feature points of the object in the depth image; and performing the second preprocessing by performing either one or both of a translation and a rotation of the object in the depth image based on the determined feature points.

The generating of the preprocessed depth image may include determining feature points of the object in the depth image; and performing the second preprocessing by transforming the object in the depth image into a frontal face based on the determined feature points and reference points of a predetermined face region.

The determining of the feature points of the object may include determining positions of the feature points of the object in the depth image to correspond to positions of feature points of the object detected in the IR image.

The performing of the second preprocessing may include: determining a transformation matrix based on the positions of the feature points of the object in the depth image and corresponding positions of the reference points of the predetermined face region; and applying the determined transformation matrix to the object in the depth image.

The determining of whether the object is a genuine object may include determining a first liveness score by inputting the preprocessed IR image as an input to a neural network-based first liveness test model; determining a second liveness score by inputting the preprocessed depth image to a neural network-based second liveness test model; and determining whether the object is a genuine object based on the first liveness score and the second liveness score.

The determining of whether the object is a genuine object may include determining a liveness score by inputting the preprocessed IR image and the preprocessed depth image to a neural network-based liveness test model; and determining whether the object is a genuine object based on the liveness score.

The method may include determining whether authentication of the object is successful based on the preprocessed IR image and the preprocessed depth image.

A non-transitory computer-readable storage medium may store instructions that, when executed by a processor, configure the processor to perform the method.

In another general aspect, a processor-implemented method includes generating a preprocessed infrared (IR) image by performing first preprocessing based on an IR image including an object; generating a preprocessed depth image by performing second preprocessing based on a depth image including the object; and determining whether authentication of the object is successful based on the preprocessed IR image and the preprocessed depth image.

The method may include acquiring the IR image including the object and the depth image including the object.

The generating of the preprocessed IR image may include generating the preprocessed IR image such that an edge component of the IR image is emphasized in the preprocessed IR image.

The generating of the preprocessed IR image may include generating a first intermediate image by performing edge emphasis on the IR image; generating a second intermediate image by performing normalization on the IR image; and generating the preprocessed IR image based on the IR image, the first intermediate image, and the second intermediate image.

The generating of the first intermediate image may include generating the first intermediate image based on a pixel values of a current pixel and neighboring pixels of the current pixel in the IR image.

The generating of the preprocessed depth image may include determining feature points of the object in the depth image; and performing the second preprocessing by performing either one or both of a translation and a rotation of the object in the depth image based on the determined feature points.

The generating of the preprocessed depth image may include determining feature points of the object in the depth image; and performing the second preprocessing by transforming the object in the depth image into a frontal face based on the determined feature points and reference points of a predetermined face region.

The determining whether authentication of the object is successful may include determining a first similarity between a first feature extracted from the preprocessed IR image and a first enrolled feature of a valid user; determining a second similarity between a second feature extracted from the preprocessed depth image and a second enrolled feature of the valid user; and determining whether authentication of the object is successful based on the first and second similarities.

The method may include determining whether the object is a genuine object based on the preprocessed IR image and the preprocessed depth image.

In another general aspect an apparatus may include: one or more image sensors configured to acquire an infrared (IR) image including an object and a depth image including the object; and a processor configured to: generate a preprocessed IR image by performing first preprocessing based on the IR image, generate a preprocessed depth image by performing second preprocessing based on the depth image, and determine either one or both of a liveness test result and an authentication result with respect to the object based on the preprocessed IR image and the preprocessed depth image.

The processor may be configured to generate the preprocessed IR image such that an edge component of the IR image is emphasized in the preprocessed IR image.

The processor may be configured to determine feature points of the object in the depth image, and perform the second preprocessing by transforming the object in the depth image into a frontal face based on the determined feature points and reference points of a predetermined face region.

In another general aspect, a processor-implemented method includes acquiring an infrared (IR) image including an object and a depth image including the object; generating a preprocessed IR image by emphasizing an edge component of the IR image; generating a preprocessed depth image by either one or both of translating and rotating the object in the depth image; and determining either one or both of a liveness and a biometric authentication of the object based on the preprocessed IR image and the preprocessed depth image.

Other features and aspects will be apparent from the following detailed description, the drawings, and the claims.

BRIEF DESCRIPTION OF THE DRAWINGS

FIGS. 8A and 8B illustrate examples of a first preprocessing process with respect to an IR image.

Figure 1:
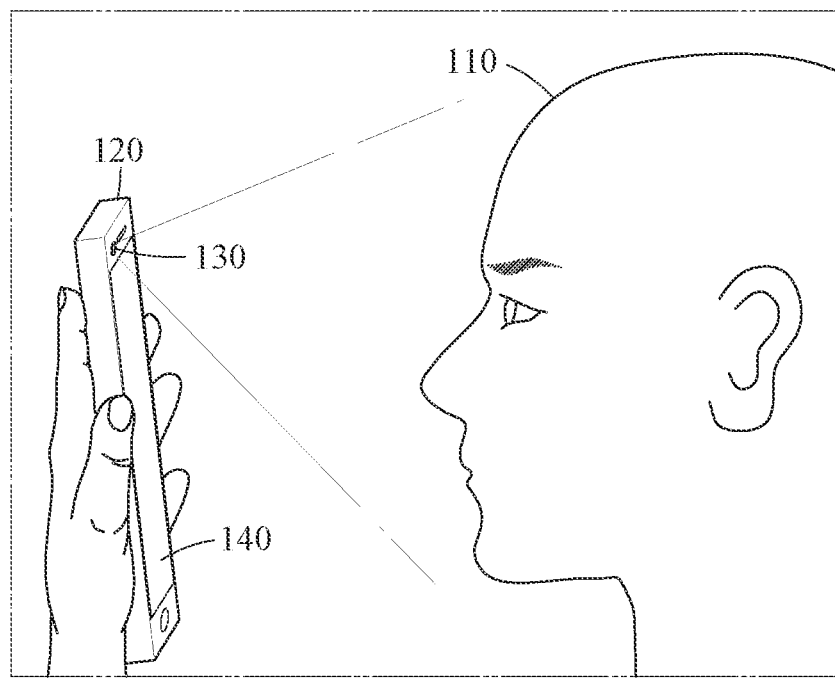
FIGS. 1 and 2 illustrate examples of a biometric authentication and a liveness test.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings, and like reference numerals in the drawings denote like elements.

Figure 2:
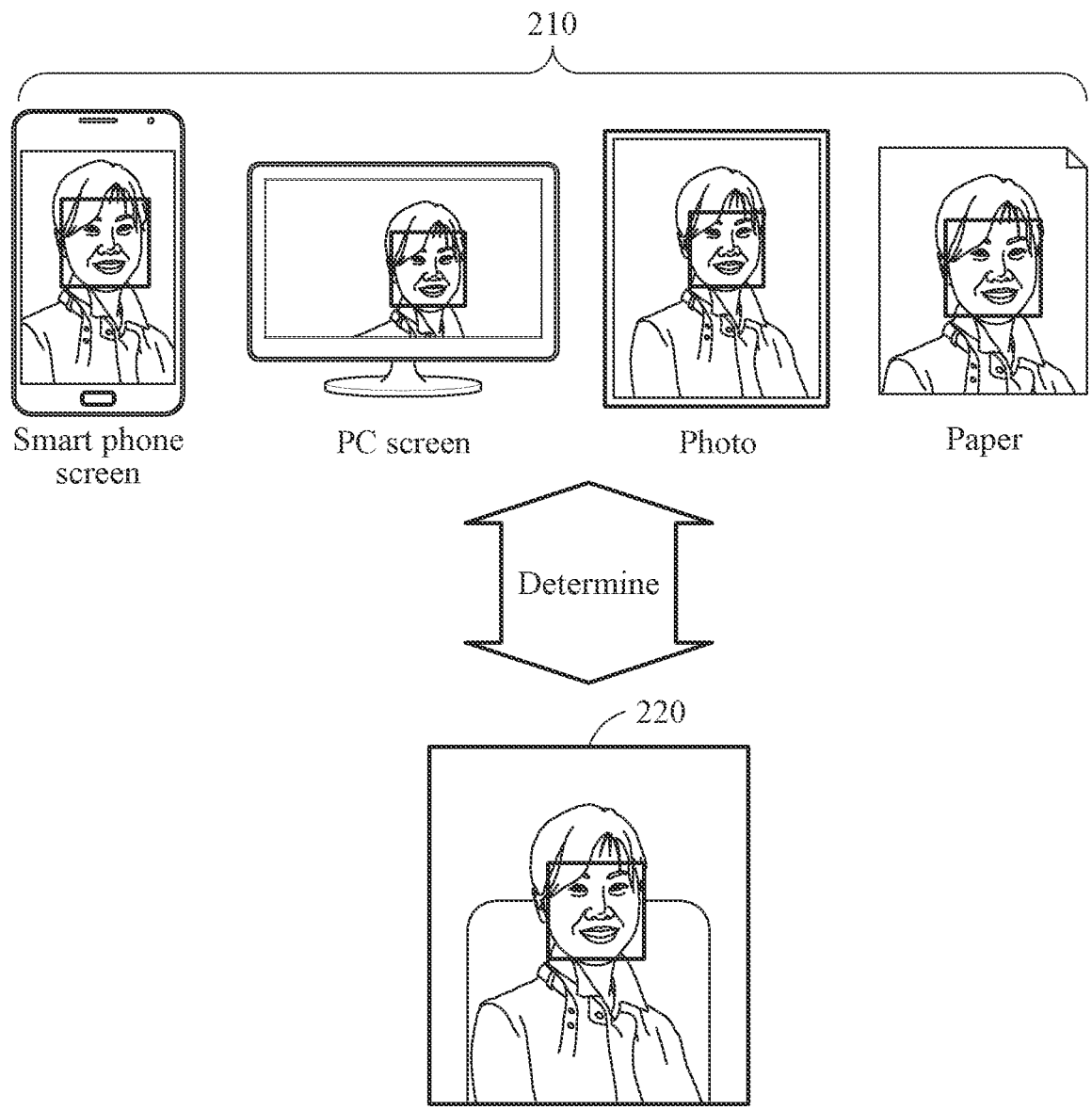

FIGS. 1 and 2 illustrate examples of a biometric authentication and a liveness test.

Among authentication technologies for user verification, a biometric authentication is authentication technology using personal biometrics such as a fingerprint, an iris, a face, veins, skin, as non-limiting examples. In the biometric authentication, a face verification may determine whether a user is a valid user based on face information of the user attempting an authentication. The face may be verification used to authenticate a valid user for a user log-in, a payment service, and/or an access control, as non-limiting examples.

Referring to FIG. 1, an electronic device 120 may perform an authentication process with respect to a user 110 attempting to access the electronic device 120 through a face verification. For example, when the user 110 attempts a face verification on the electronic device 120 to unlock the electronic device 120, the electronic device 120 may acquire a face image of the user 110 using an image sensor or an image acquiring device such as a camera 130, and may determine whether to unlock the electronic device 120 by analyzing the acquired face image. In an example, the electronic device 120 may determine the user 110 is attempting to access the electronic device 120 through the face verification when an input is received from the user 110. The input may be a face of the user 110 being positioned in a field of view of the camera 130 and/or a touching of a display/user interface 140 of the electronic device 120, as non-limiting examples. A process of analyzing the face image may include a process of detecting a face region in the face image and extracting features from the face region using a feature extractor. The extracted features may be compared to enrolled features of a valid user, and whether the face verification is successful may be determined based on a result of the comparing. In response to the determination that the face verification is successful, the user 110 may succeed in unlocking the electronic device 120 and further interact with additional functions of the electronic device 120, e.g., using the display/user interface 140. Conversely, in response to the determination that the face verification has failed, the electronic device 120 may continue to operate in a locked state. In another example, when the user 110 performs a face verification on the electronic device 120 to perform a payment service through the electronic device 120, the electronic device 120 may acquire a face image of the user 110 and approve and implement a payment request when the user 110 is recognized as a valid user as a result of analyzing the face image; otherwise, electronic device 120 may reject the payment request.

A valid user may enroll his/her face in the electronic device 120 in advance through a face enrollment process, and the electronic device 120 may store information to be used to identify the valid user in a storage device or cloud storage. For example, a face image of the valid user or face features extracted from the face image may be stored as enrolled information of the valid user.

In the biometric authentication process such as the face verification described above, a liveness test may be performed. Before or after the biometric authentication result is determined, the liveness test may be performed. In another example, the biometric authentication process and the liveness test process may be performed together. The liveness test may be to test whether an object (being a test subject) is an animate object, and to determine whether an authentication means is genuine. For example, the liveness test may test whether a face shown in an image captured by the camera 130 is a genuine face of a person or a fake face. The liveness test may be used to discriminate between inanimate objects (for example, a photo, paper, a video, and a model as a fake means) and animate objects (for example, a real face of a person).

FIG. 2 illustrates examples of fake faces 210 and a genuine face 220. Through a liveness test, the electronic device 120 may identify the genuine face 220 in a test subject image acquired by capturing a real user face. Further, through a liveness test, the electronic device 120 may identify a fake face 210 in a test subject image acquired by capturing a user face displayed on a PC screen or a smart phone screen, a user face in a photo, a user face printed on paper, or a model of the user face, as non-limiting examples.

An invalid user may attempt to cause a false acceptance of a user authentication system using spoofing techniques. For example, in a face verification, the invalid user may present a color photo, a video, or a model of a face of a valid user through the camera 130 in an attempt to cause a false acceptance. The liveness test may prevent a false acceptance by filtering authentication attempts (for example, spoofing attacks) using a substitute such as a photo, a video, a mask, or a model. In response to the determination that the authentication subject is an inanimate object as a result of the liveness test, the electronic device 120 may not move to a user authentication operation of comparing the input object with an enrolled object to determine matching therebetween, or may determine that the user authentication is finally failed irrespective of a user authentication result.

Referring back to FIG. 1, the electronic device 120 may perform one of the liveness test and the biometric authentication, or perform both the liveness test and the biometric authentication. The electronic device 120 may be, as non-limiting examples, a smart phone, a wearable device, a tablet computer, a netbook, a laptop, a desktop, a personal digital assistant (PDA), a set-top box, a home appliance, a biometric door lock, a security device, and/or a vehicle starting device.

For the liveness test and/or biometric authentication process, the electronic device 120 may acquire an infrared (IR) image and a depth image through the camera 130. For example, the IR image may be acquired by an IR camera, and the depth image acquired by a depth camera. In another example, without using a separate depth camera, the IR image and the depth image may be acquired by the IR camera. For example, depth information represented by the depth image may be determined based on a pattern of IR reflected light received by the IR camera. The camera 130 is thus representative of one or more cameras of the electronic device 120, including one or more IR cameras and one or more depth cameras, and may further be representative of one or more color image cameras.

The electronic device 120 may perform the liveness test and/or the biometric authentication using the IR image and the depth image acquired as described above. Unlike the IR image and the depth image, a color image may be greatly affected by an environment (for example, lightings and shadows) in which the color image is captured (e.g., by the color image camera). There is a technological problem in using a color image to perform a liveness test and/or a biometric authentication because the color image has a disadvantage of being vulnerable to spoofing attacks by a high-definition medium such as a high-definition display device or printout. When an IR image and a depth image are used according to one or more embodiments of the present disclosure, such a technological problem may be solved. Through an IR image, reflection characteristic of an object and a texture characteristic by the reflection of IR rays may be considered, and thus a liveness test and/or a biometric authentication robust against the effects of lightings or shadows may be performed. Through a depth image, a cubic effect characteristic of an object may be considered, and thus a liveness test and/or a biometric authentication robust against spoofing attacks using an image shown on a plane such as a display device or a printout may be performed. Accordingly, when both the IR image and the depth image are used, one or more embodiments of the present disclosure may solve a technological problem of a false acceptance by spoofing techniques by effectively preventing such false acceptance, and the accuracy of the liveness test and the biometric authentication may advantageously improve.

In examples set forth below, an IR image and a depth image may be preprocessed to perform a liveness test and/or a biometric authentication. Performance of the liveness test and/or the biometric authentication further may improve by using the preprocessed IR image and the preprocessed depth image to perform the liveness test and/or the biometric authentication. Hereinafter, the examples will be described in detail with reference to the drawings.

Figure 3:
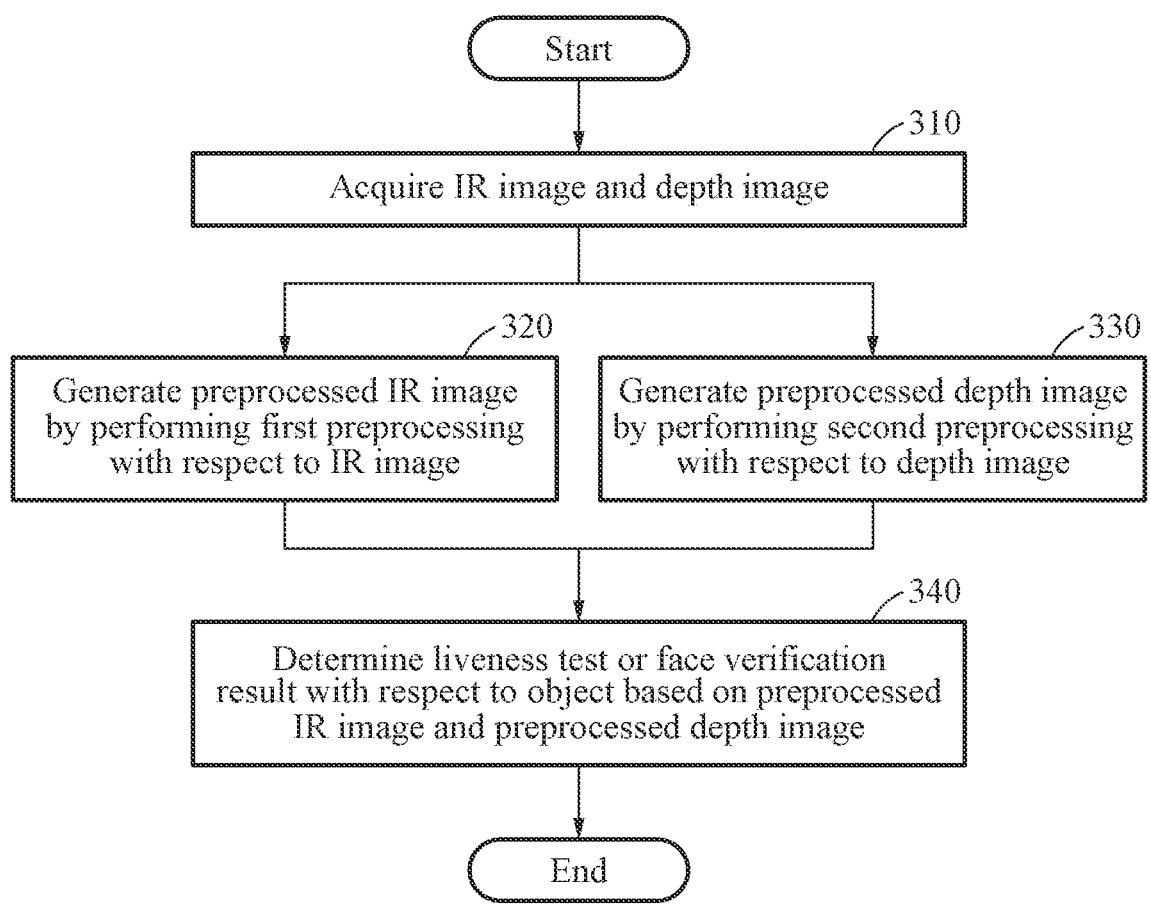
FIG. 3 illustrates an example of operations of a liveness test method and a biometric authentication method.

FIG. 3 illustrates an example of operations of a liveness test method and a biometric authentication method. The liveness test method and the biometric authentication method may be performed by apparatuses described herein, which for convenience of explanation will be referred to as "test apparatuses," without any intended use of the term "test."

Referring to FIG. 3, in operation 310, the test apparatus may acquire an IR image including an object and a depth image including the object. The test apparatus may acquire the IR image and the depth image through an image sensor. The IR image and the depth image may be captured at the same time by means of the image sensor or captured at a time interval. The IR image and the depth image may be acquired by image sensors configured to respectively sense an IR value and a depth value, or extracted based on an IR value sensed through a single image sensor.

The IR image may be acquired by sensing, using the image sensor, an IR ray reflected by an object after the IR ray is radiated from an IR light source. The depth image may be acquired through a time-of-flight (ToF)-based sensor or a structured light-based sensor, and each pixel of the depth image may have a value indicating a depth or a distance to a corresponding point. However, the method of acquiring an IR image and a depth image is not limited thereto.

In operation 320, the test apparatus may generate a preprocessed IR image by performing first preprocessing with respect to the IR image.

The test apparatus may first detect a face region and feature points such as facial landmarks in the IR image. For example, the test apparatus may detect the face region in the IR image using a Viola-Jones detector, a neural network trained to detect a face region, and/or a Haar-based cascade AdaBoost classifier. However, the examples are not limited thereto. The test apparatus may detect a face region in an input image using various face region detection techniques. For example, the test apparatus may detect facial landmarks in the IR image and detect a bounding region including the detected landmarks as the face region. The test apparatus may detect both endpoints of a left eye, both endpoints of a right eye, a nose tip point, and points corresponding to both corners of a mouth, as non-limiting examples of the feature points in the face region. The first preprocessing performed in operation 320 may be performed with respect to the face region detected in the IR image.

The test apparatus may perform the first preprocessing for processing the IR image to the form more appropriate for a liveness test or a face verification. For example, the test apparatus may acquire a first preprocessed image by applying an edge enhancement filter to the IR image. The test apparatus may generate a preprocessed IR image (hereinafter, referred to as the "first preprocessed image") in which an edge component is emphasized (or augmented) by performing the first preprocessing with respect to the IR image. Through the first preprocessing, the first preprocessed image with an edge sharpened when compared to the original IR image is generated.

In relation to the first preprocessing process, the test apparatus may generate a first intermediate image based on pixel values of a current pixel and neighboring pixels in the IR image, generate a second intermediate image by performing normalization on the IR image, and generate the first preprocessed image based on the original IR image, the first intermediate image, and the second intermediate image.

The test apparatus may generate the first intermediate image by performing edge emphasis based on a pixel value of the current pixel and pixel values of the neighboring pixels of the current pixel in the IR image. In detail, the test apparatus may generate a first channel IR image configured with a pixel value of a neighboring pixel positioned immediately above each pixel included in the IR image, a second channel IR image configured with a pixel value of a neighboring pixel positioned immediately below each pixel included in the IR image, a third channel IR image configured with a pixel value of a neighboring pixel positioned immediately on the left side of each pixel included in the IR image, and a fourth channel IR image configured with a pixel value of a neighboring pixel positioned immediately on the right side of each pixel included in the IR image. The test apparatus may generate a single-channel IR image in which the four-channel IR images are combined, by combining pixel values of a pixel at corresponding positions in the first, second, third, and fourth channel IR images generated as described above. Here, the combination of the pixel values may be a sum, a mean, or a weighted sum of the pixel values. However, the combination scheme is not limited thereto. The test apparatus may generate the first intermediate image by combining pixel values of a pixel at corresponding positions in the generated single-channel IR image and the original IR image. The combination of the pixel values may be a mean, a weighted sum, or a simple sum of the pixel values. However, the combination scheme is not limited thereto. In an example, the test apparatus may adjust the range of pixel values of the first intermediate image by performing normalization, such as a zero-mean technique, on the first intermediate image.

In another example, the test apparatus may generate the first intermediate image using other edge emphasis techniques, for example, Canny, Histogram of Oriented Gradients (HOG), Local Binary Pattern (LBP), and/or Sobel. However, the examples are not limited to the edge emphasis techniques described above. Other edge emphasis techniques may apply thereto without limitation.

Further, the test apparatus may generate the second intermediate image by performing normalization on the IR image. For example, the test apparatus may generate the second intermediate image with the adjusted range of pixel values by determining a maximum value and a minimum value among the pixel values of the IR image and performing normalization such as a zero-mean technique based on the maximum value and the minimum value.

The test apparatus may generate the first preprocessed image by combining the IR image, the first intermediate image, and the second intermediate image. For example, the test apparatus may generate the first preprocessed image by configuring pixel values of pixels corresponding to each other (that is, at the same position) in the IR image, the first intermediate image, and the second intermediate image, as three channels. In an example, the test apparatus may generate the first preprocessed image to have a depth of three channels, where a first channel corresponds to the IR image, a second channel corresponds to the first intermediate image, and a third channel corresponds to the second intermediate image. A pixel of the first preprocessed image generated as described above may have a pixel value of a pixel at a corresponding position in the IR image, a pixel value of a pixel at a corresponding position in the first intermediate image, and a pixel value of a pixel at a corresponding position in the second intermediate image.

In operation 330, the test apparatus may generate a preprocessed depth image (hereinafter, referred to as the "second preprocessed image") by performing second preprocessing with respect to the depth image. The test apparatus may perform the second preprocessing for processing the depth image to a form more appropriate for a liveness test or a face verification. For example, the test apparatus may generate the second preprocessed image in which an object (e.g., a face) shown in the depth image is transformed into a front-facing object (e.g., a frontal face) by performing the second preprocessing with respect to the depth image.

The test apparatus may determine feature points of an object in the depth image by matching the face region and the feature points detected in the IR image to the depth image. The test apparatus may determine positions in the depth image corresponding to the positions of the feature points detected in the IR image to be the positions of the feature points of the depth image. The test apparatus may perform the second preprocessing including at least one of a translation and a rotation of the object shown in the depth image based on the feature points determined in the depth image. For example, the test apparatus may determine a transformation matrix based on the positions of the respective feature points of the depth image and positions of reference points corresponding to the respective feature points, and may generate the second preprocessed image in which a pose of the object is transformed into a frontal pose by applying the determined transformation matrix to the object shown in the depth image.

In operation 340, the test apparatus may determine a liveness test result or a face verification result with respect to the object based on the first preprocessed image (the preprocessed IR image) and the second preprocessed image (the preprocessed depth image).

Determining a liveness of the object may include determining whether the object is an animate genuine object or an inanimate fake object. The liveness of the object may be determined according to the process described below. The test apparatus may determine a first liveness score using a neural network-based first liveness test model which uses the first preprocessed image as an input, and may determine a second liveness score using a neural network-based second liveness test model which uses the second preprocessed image as an input.

The test apparatus may determine the liveness of the object based on the first liveness score and the second liveness score. The test apparatus may combine the first liveness score and the second liveness score and determine the liveness based on a result of the combining. Here, the combination of the first liveness score and the second liveness score may be a mean, a weighted sum, or a simple sum. However, the combination scheme is not limited thereto. The test apparatus may determine the object (being a test subject) to be a genuine object if a result value of the combination of the first liveness score and the second liveness score is greater than a threshold value, and may determine the object to be a fake object if the result value of the combination is less than or equal to the threshold value.

In another example, the test apparatus may determine a liveness score using a single neural network-based liveness test model which uses the first preprocessed image and the second preprocessed image as an input and determines the liveness of the object based on the determined liveness score. The test apparatus may determine the object (being a test subject) to be a genuine object if the liveness score is greater than a threshold value, and may determine the object to be a fake object if the liveness score is less than or equal to the threshold value.

The liveness test model described in the above examples may be, for example, a neural network configured to output a value calculated by internal parameters based on input data. The liveness test model may provide the liveness score indicating a feature value, a probability value, and/or a value that a face object (being a test subject) corresponds to a genuine face or a fake face, based on the input data. The liveness test model may be or include a deep convolutional neural network (DCNN) model. The DCNN model may include one or more convolution layers, one or more pooling layers, and one or more fully connected layers, and may provide information for determining the liveness from image information input into the liveness test model through computing and activation processes performed by each layer. Here, the image information may be pixel values (for example, color values and/or brightness values) of pixels included in an image. The DCNN model is merely provided as an example. The liveness test model may be or include a neural network model of a structure other than that of the DCNN model.

Parameters of the liveness test model may be parameters determined through a training process based on training data. In the training process, there may be numerous training data and desired values corresponding to the training data. In the training process, the liveness test model may receive training data and output result values corresponding to the training data through computing and activation processes based on the parameters. The liveness test model may be trained by calculating a loss caused by differences between the output values and the desired values and adjusting the parameters of the liveness test model to reduce and/or minimize the loss. By iteratively performing this process with respect to each item of the numerous training data, the parameters of the liveness test model may be adjusted gradually in various examples.

The test apparatus may perform a control operation in response to the liveness test result with respect to the object. If the test subject is finally determined to be a genuine object, the test apparatus may generate a control signal for requesting the execution of a user authentication procedure. Conversely, if the object is finally determined to be a fake object other than a genuine object, the test apparatus may generate a control signal for blocking an access of a user, rather than requesting execution of the user authentication process.

Meanwhile, the test apparatus may determine a face verification result with respect to the object based on the first preprocessed image (the preprocessed IR image) and the second preprocessed image (the preprocessed depth image). Face verification with respect to the object may be performed according to the process described below. The test apparatus may determine a first feature corresponding to the first preprocessed image using a neural network-based first feature extraction model which uses the first preprocessed image as an input, and may determine a second feature corresponding to the second preprocessed image using a neural network-based second feature extraction model which uses the second preprocessed image as an input. The test apparatus may determine whether the first feature and the second feature are respectively similar to a first enrolled feature and a second enrolled feature of an enrolled valid user, and may determine that the face verification is successful if similarities therebetween are greater than a threshold value. If the similarities are less than or equal to the threshold value, the test apparatus may determine that the face verification has failed. If the face verification is successful, the test apparatus may generate a control signal to allow an access or request of the object (or a user of the object). Conversely, if the face verification has failed, the test apparatus may generate a control signal to block the access of the object (or the user of the object) or reject the request.

As described above, when an IR image and a depth image are used for a liveness test or a biometric authentication, one or more embodiments of the present disclosure may utilize advantages of an IR image and a depth image to overcome the technical problems of performing a liveness test and/or a biometric authentication using a color image, as described above with reference to FIG. 1. Further, by preprocessing an IR image and depth image and using the preprocessed IR image and depth image for a liveness test and/or a biometric authentication, one or more embodiments of the present disclosure may improve the technological field of liveness tests and biometric authentication by improving the accuracy of the liveness test and/or the accuracy of the biometric authentication.

Figure 4:
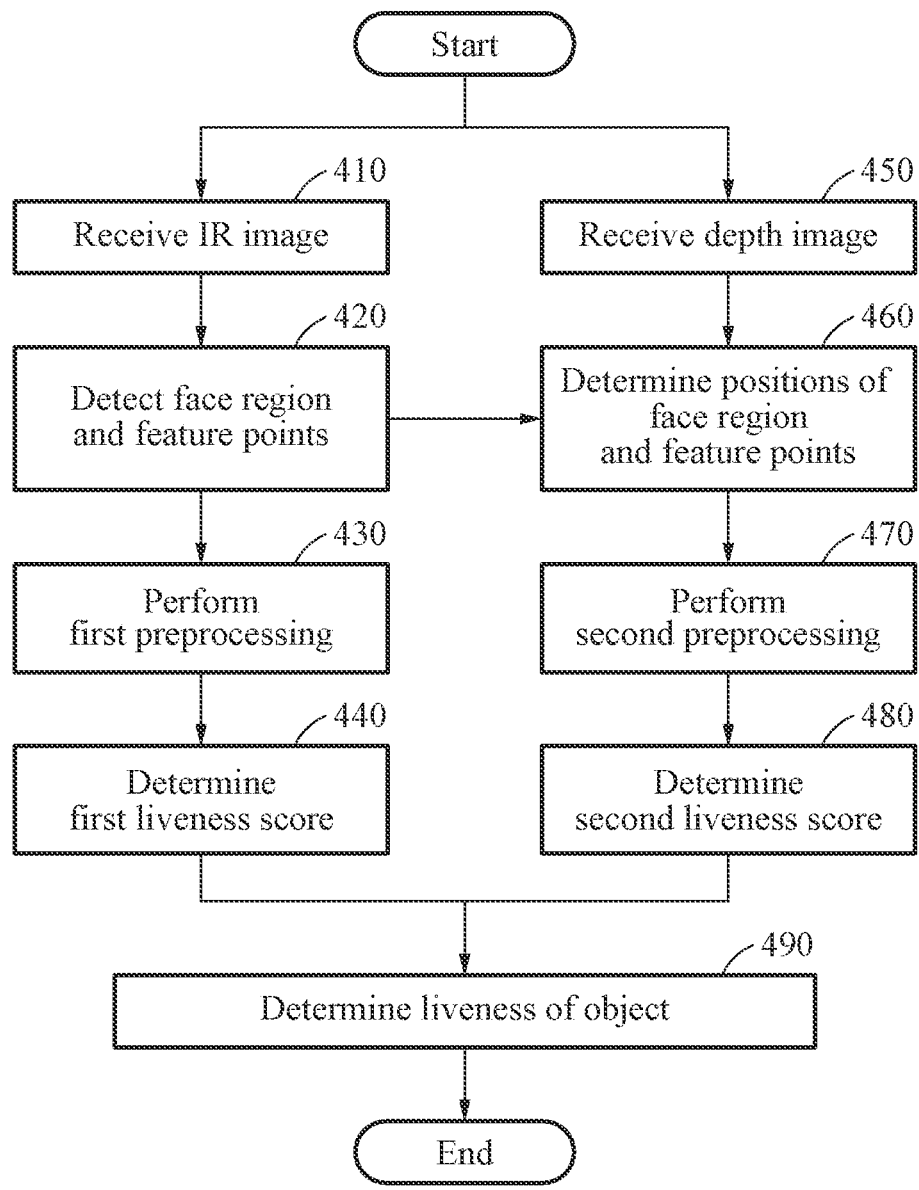
FIG. 4 illustrates an example of a liveness test method.

FIG. 4 illustrates an example of a liveness test method.

The description provided above with reference to FIGS. 1 to 3 also applies to a non-limiting example of FIG. 4 and descriptions thereof are incorporated herein by reference.

Referring to FIG. 4, in operation 410, the test apparatus may receive an IR image. In operation 420, the test apparatus may detect a face region and feature points including facial landmarks in the IR image. The test apparatus may detect the face region in the IR image using a Viola-Jones detector, a Haar-based cascade AdaBoost classifier, and/or a neural network trained to detect a face region. As the feature points in the face region, the test apparatus may detect both endpoints of a left eye, both endpoints of a right eye, a nose tip point, and/or points corresponding to both corners of a mouth, as non-limiting examples.

In operation 430, the test apparatus may perform first preprocessing with respect to the IR image. The first preprocessing may be performed with respect to a patch region corresponding to the face region of the IR image. The test apparatus may generate a first preprocessed image that is the IR image in which an edge component is emphasized by performing the first preprocessing with respect to the IR image. The test apparatus may generate the first preprocessed image with a new characteristic of the IR image using an edge emphasis filter such as Canny, HOG, LBP, and/or Sobel, or using a scheme of using the intermediate images described above with reference to FIG. 3, as a non-limiting example.

In operation 440, the test apparatus may determine a first liveness score using a first liveness test model which uses the first preprocessed image as an input. The first liveness test model may output the first liveness score indicating a possibility index that an object corresponds to a genuine object based on information (for example, pixel values) of the input first preprocessed image.

In operation 450, the test apparatus may receive a depth image corresponding to the IR image. The IR image and the depth image may be acquired by capturing the same object from the same viewpoint. In operation 460, the test apparatus may determine positions of the face region and the feature points in the depth image. The test apparatus may determine the positions of the face region and the feature points in the depth image by matching the positions of the face region and the feature points in the IR image detected in operation 420 to the depth image.

In operation 470, the test apparatus may perform second preprocessing with respect to the depth image. For example, the test apparatus may generate a second preprocessed image in which an object (face) shown in the depth image is transformed into a frontal face through the second preprocessing. The test apparatus may determine a transformation matrix based on a relationship between the positions of the feature points determined in the depth image and positions of reference points corresponding to the frontal face, and may adjust the object shown in the depth image in a direction of the frontal face by applying the determined transformation matrix to the depth image. Through the application of the transformation matrix, the IR image may be transformed such that the positions of the respective feature points determined in the depth image translate to the positions of the reference points corresponding to the feature points.

In operation 480, the test apparatus may determine a second liveness score using a second liveness test model which uses the second preprocessed image as an input. The second liveness test model may output the second liveness score indicating a possibility index that the object corresponds to a genuine object based on information (for example, pixel values) of the input second preprocessed image.

In operation 490, the test apparatus may determine a liveness of the object based on the first liveness score and the second liveness score. For example, the test apparatus may determine a sum or a mean of the first liveness score and the second liveness score to be a final liveness score. In another example, the test apparatus may apply a weight to at least one of the first liveness score and the second liveness score, and may determine a final liveness score based on a result of applying the weight (for example a weighted sum). The weight may be, for example, a predetermined constant. Different weights may be respectively applied to the first liveness score and the second liveness score. In another example, the weight may be a condition weight determined based on a determined current condition (for example, a distance to the object, a quality of image, a size of the face region, a pose of a face shown in the face region, the position of the face region, whether there is an occluded region in the face region, or a lighting condition of the face region).

The test apparatus may determine the liveness of the test subject based on the final liveness score satisfies a preset condition. For example, if the final liveness score is greater than a preset threshold value, the test apparatus may determine the object to be a genuine object. If the final liveness score is less than or equal to the threshold value, the test apparatus may determine the object to be a fake object.

Figure 5:
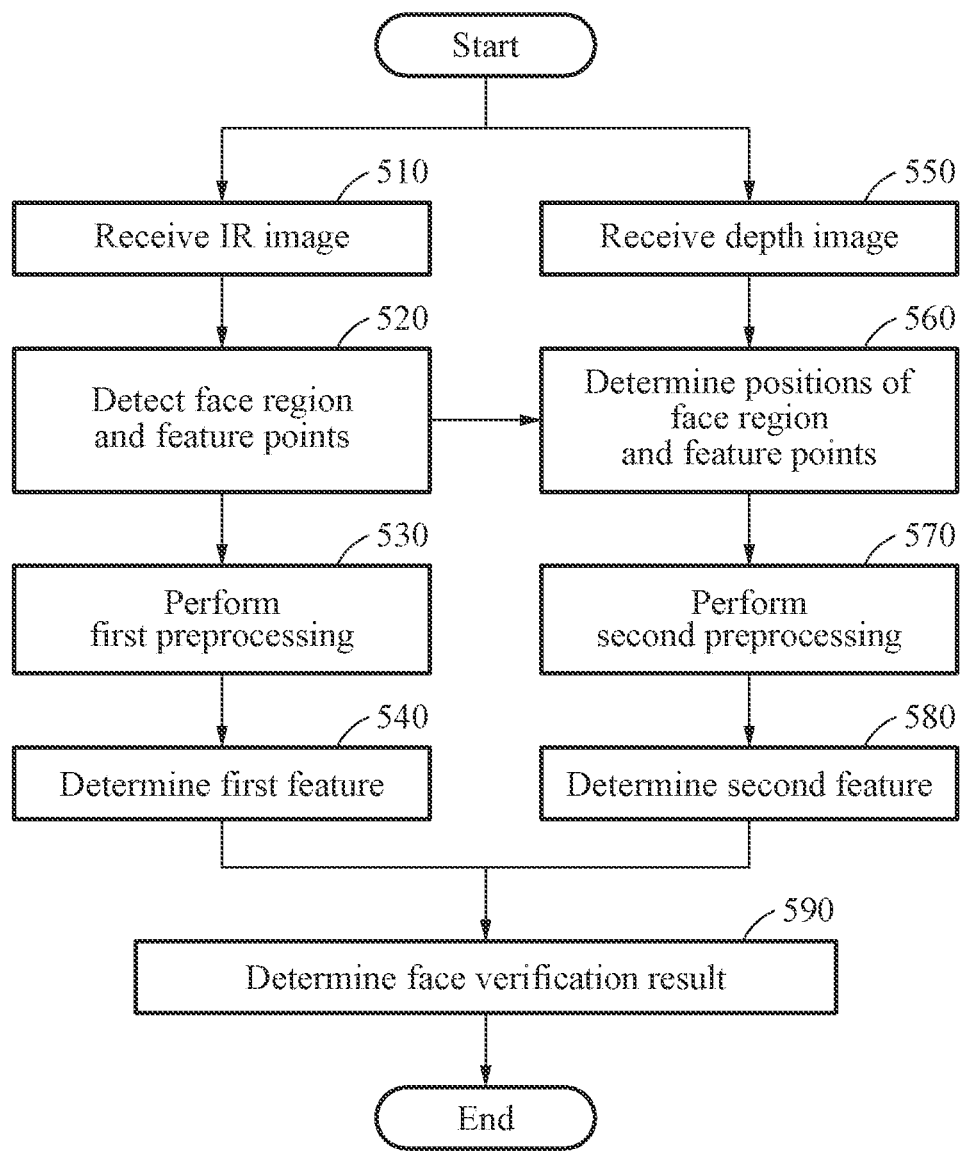
FIG. 5 illustrates an example of a biometric authentication method.

FIG. 5 illustrates an example of a biometric authentication method.

The description provided above with reference to FIGS. 1 to 3 also applies to a non-limiting example of FIG. 5 and descriptions thereof are incorporated herein by reference. Further, in a non-limiting example, operations 410, 420, 430, 450, 460, and 470 of FIG. 4 may be similar to, or the same as, respective operations 510, 520, 530, 550, 560, and 570 of FIG. 5.

In operation 540, the test apparatus may determine a first feature corresponding to a first preprocessed image, which is an IR image on which first preprocessing is performed, using a first feature extraction model which uses the first preprocessed image as an input. The first feature extraction model may output the first feature which is a feature vector corresponding to the object based on information (for example, pixel values) of the input first preprocessed image.

In operation 580, the test apparatus may determine a second feature corresponding to a second preprocessed image, which is a depth image on which second preprocessing is performed, using a second feature extraction model which uses the second preprocessed image as an input. The second feature extraction model may output the second feature which is a feature vector corresponding to the object based on information (for example, pixel values) of the input second preprocessed image.

In operation 590, the test apparatus may determine a face verification result based on the first feature and the second feature. The test apparatus may determine whether the first feature and the second feature are respectively similar to a first enrolled feature and a second enrolled feature of an enrolled valid user, and may determine similarities therebetween. The test apparatus may determine a combined value (for example, a sum, a difference, a mean, a weighted sum, or a standard deviation) of the similarity between the first feature and the first enrolled feature and the similarity between the second feature and the second enrolled feature to be a final similarity. If the determined final similarity is greater than a threshold value, the test apparatus may determine that the face verification is successful. If the final similarity is less than or equal to the threshold value, the test apparatus may determine that the face verification has failed.

In an example, the test apparatus may determine the similarity between the first feature and the first enrolled feature based on a determined difference between the similarity between the first feature and the first enrolled feature, and may determine the similarity between the second feature and the second enrolled feature based on a determined difference between the similarity between the second feature and the second enrolled feature. In an example, the test apparatus may determine the similarity between the first feature and the first enrolled feature to be inversely proportional to the determined difference between the similarity between the first feature and the first enrolled feature, and may determine the similarity between the second feature and the second enrolled feature to be inversely proportional to the determined difference between the similarity between the second feature and the second enrolled feature. In an example, the test apparatus may determine a combined value (for example, a sum, a difference, a mean, a weighted sum, or a standard deviation) of the difference between the first feature and the first enrolled feature and the difference between the second feature and the second enrolled feature to be a final difference. If the determined final difference is less than a threshold value, the test apparatus may determine that the face verification is successful. If the final difference is greater than or equal to the threshold value, the test apparatus may determine that the face verification has failed.

In an example, the first enrolled feature and the second enrolled feature may be determined during a user enrollment process performed in advance. The first enrolled feature may be a feature vector obtained from the first feature extraction model by performing the first preprocessing with respect to an IR image of the valid user and then inputting the first preprocessed image into the first feature extraction model. The second enrolled feature may be a feature vector obtained from the second feature extraction model by performing the second preprocessing with respect to a depth image of the valid user and then inputting the second preprocessed image into the second feature extraction model.

Meanwhile, in the flowcharts of FIGS. 3 to 5, in examples implemented differently, a function or an operation stated in a predetermined block may be performed differently from the flowcharts. For example, two successive blocks may be performed substantially at the same time in practice, or in a reversed order of the blocks depending on a related function or operation. In another example, blocks shown in parallel may be performed substantially sequentially in practice.

Figure 6:
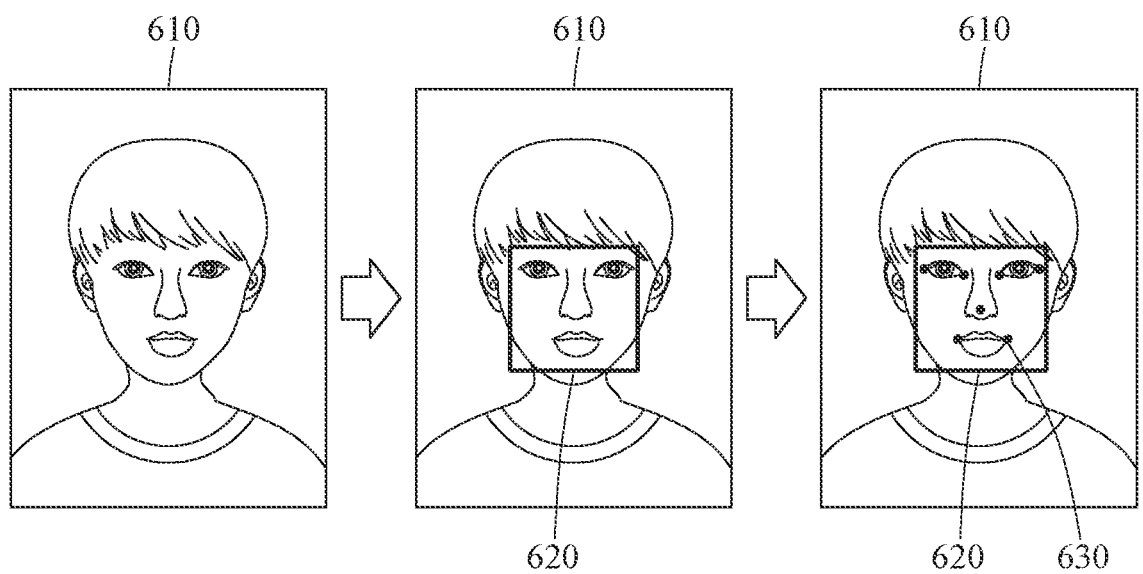
FIG. 6 illustrates an example of detecting a face region and feature points from an infrared (IR) image.

FIG. 6 illustrates an example of detecting a face region and feature points from an IR image.

Referring to FIG. 6, the test apparatus may receive an IR image 610 and detect a face region 620 in the IR image 610. For example, the test apparatus may detect the face region 620 using, as non-limiting examples, a neural network, a Viola-Jones detector, and/or a Haar-based cascade AdaBoost classifier. The test apparatus may detect feature points 630 in the face region 620 corresponding to endpoints of both eyes, a nose tip point, and both corner points of a mouth, as non-limiting examples. For example, the test apparatus may detect the feature points 630 using a technique such as Speeded Up Robust Features (SURF), Active Appearance Model (AAM), Active Shape Model (ASM), Supervised Descent Method (SDM), and/or deep learning.

Figure 7A:
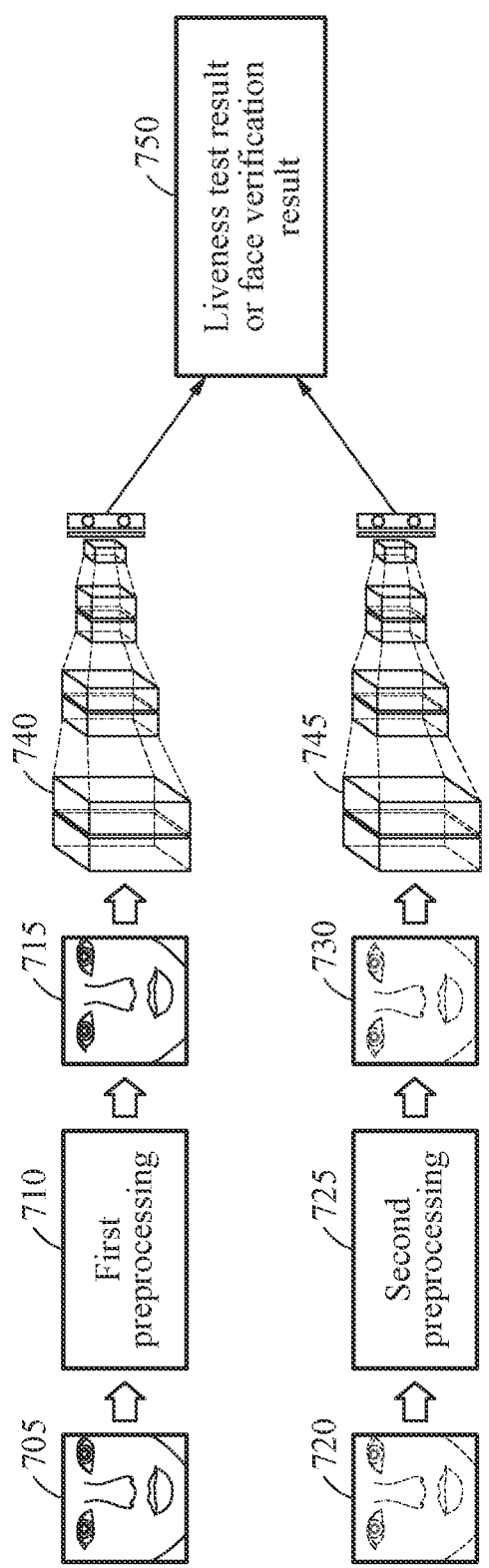
FIGS. 7A and 7B illustrate examples of a liveness test or biometric authentication process.
Figure 7B:
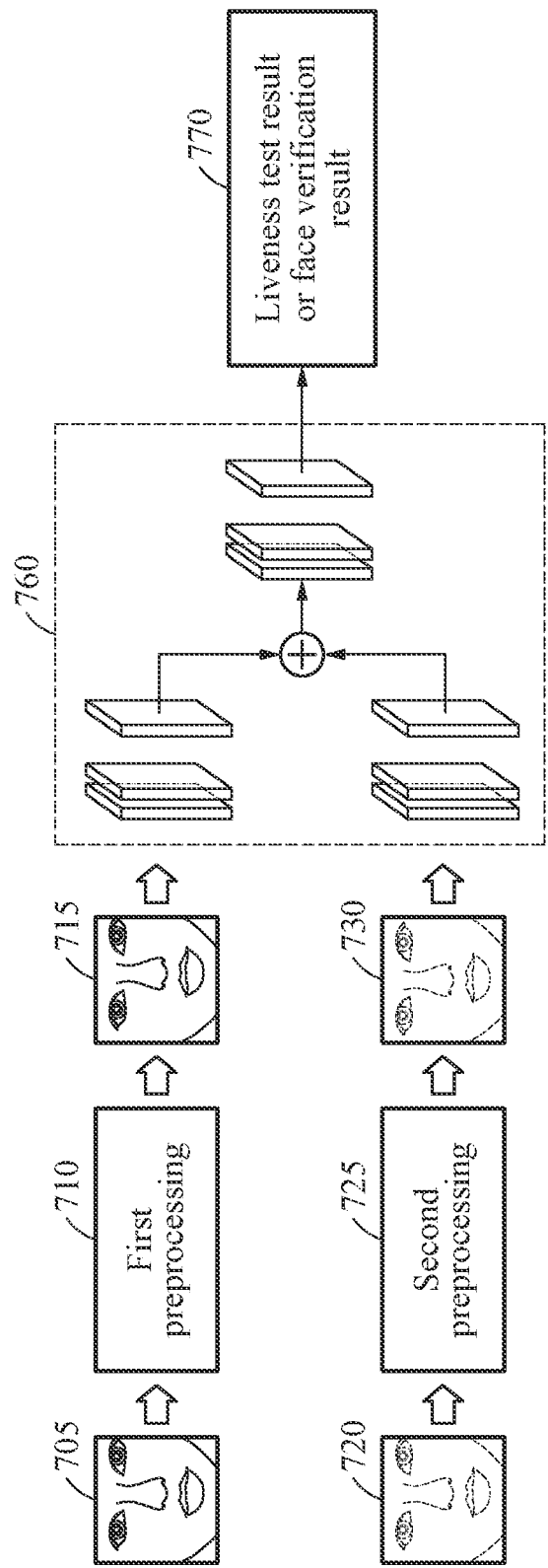

FIGS. 7A and 7B illustrate examples of a liveness test or biometric authentication process.

Referring to FIG. 7A, the test apparatus may generate a first preprocessed image 715 by performing first preprocessing 710 on an IR image 705 corresponding to a face region. The first preprocessing 710 may include image processing for emphasizing an edge of the IR image 705. Further, the test apparatus may generate a second preprocessed image 730 by performing second preprocessing 725 on a depth image 720 corresponding to the face region. The second preprocessing 725 may include image processing for changing a direction faced by an object of the depth image 720. For example, the second preprocessing 725 may include a process of defining a transformation matrix to change the direction faced by the object to a frontal direction and applying the transformation matrix to the depth image 720.

When the test apparatus performs a liveness test, the first preprocessed image 715 may be input into a first neural network model 740, and the first neural network model 740 may output a first liveness score corresponding to the first preprocessed image 715. The second preprocessed image 730 may be input into a second neural network model 745, and the second neural network model 745 may output a second liveness score corresponding to the second preprocessed image 730. In an example, the first and second neural network models 740 and 745 may be provided separately and respectively correspond to first and second liveness test models. The test apparatus may determine a liveness test result 750 based on the first liveness score and the second liveness score.

When the test apparatus performs a face verification as a biometric authentication, the first preprocessed image 715 may be input into the first neural network model 740, and the first neural network model 740 may output a first feature corresponding to the first preprocessed image 715. The second preprocessed image 730 may be input into the second neural network model 745, and the second neural network model 745 may output a second feature corresponding to the second preprocessed image 730. In an example, the first and second neural network models 740 and 745 may respectively correspond to first and second feature extraction models. The test apparatus may determine a face verification result 750 based on a similarity between the first feature and a first enrolled feature and a similarity between the second feature and a second enrolled feature.

FIG. 7B illustrates an example of using a single neural network model 760. When the test apparatus performs a liveness test, the first preprocessed image 715 and the second preprocessed image 730 may be input into the single neural network model 760, and the neural network model 760 may output a liveness score. The test apparatus may determine a liveness test result 770 with respect to an object based on the output liveness score. As in an example, a single integrated neural network model 760 may be configured to perform the functions of the first and second neural network models 740 and 745 of FIG. 7A.

When the test apparatus performs a face verification, the first preprocessed image 715 and the second preprocessed image 730 may be input into the single neural network model 760, and the neural network model 760 may output a single feature into which features of the first preprocessed image 715 and the second preprocessed image 730 are integrated. The test apparatus may determine a face verification result 770 based on the feature output from the neural network model 760. For example, the test apparatus may determine a similarity between the feature and an enrolled feature that is enrolled in advance. If the similarity is greater than a threshold value, the test apparatus may determine that the face verification is successful. If the similarity is less than or equal to the threshold value, the test apparatus may determine that the face verification is failed.

Figure 8B:
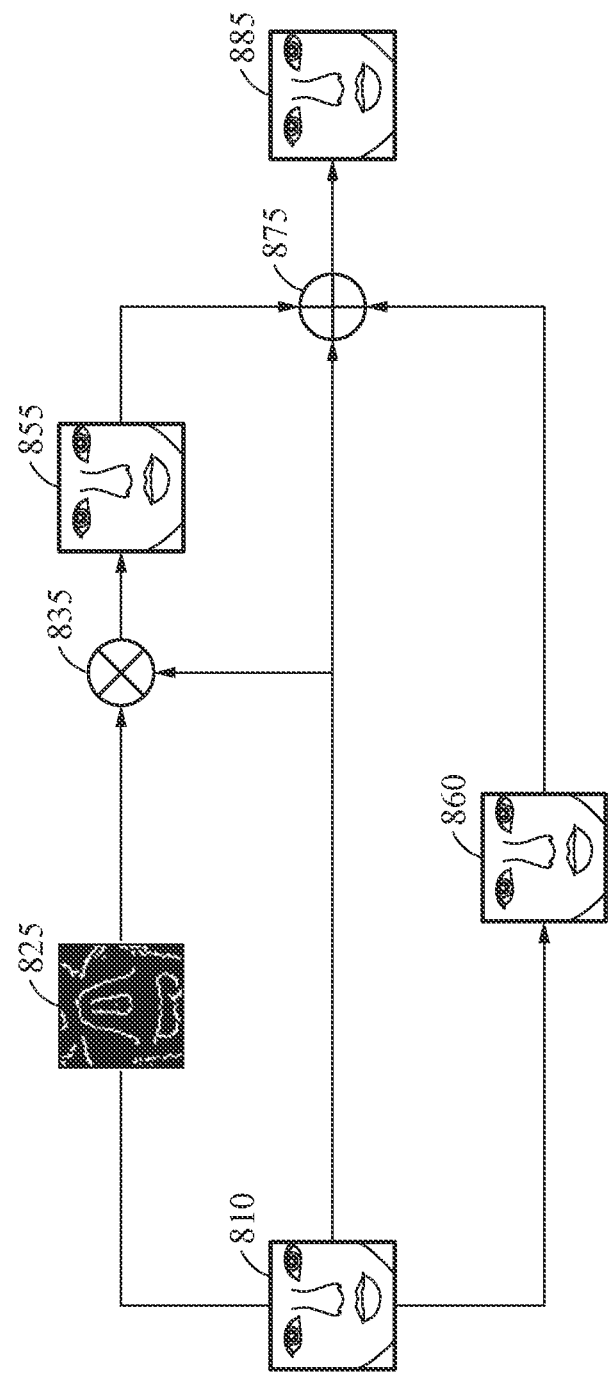

FIGS. 8A and 8B illustrate examples of a first preprocessing process with respect to an IR image.

Referring to FIG. 8A, the test apparatus may acquire an IR image in the form more appropriate for a liveness test or a biometric authentication through first preprocessing. First, the test apparatus may receive an IR image 810. The IR image 810 may correspond to a face region.

The test apparatus may generate a first channel IR image configured with a pixel value of a neighboring pixel positioned immediately above each pixel included in the IR image 810, a second channel IR image configured with a pixel value of a neighboring pixel positioned immediately below each pixel included in the IR image 810, a third channel IR image configured with a pixel value of a neighboring pixel positioned immediately on the left side of each pixel included in the IR image 810, and a fourth channel IR image configured with a pixel value of a neighboring pixel positioned immediately on the right side of each pixel included in the IR image 810.

The test apparatus may generate a single-channel IR image 830 in which the four-channel IR images are combined, by combining pixel values of a pixel at corresponding positions in the first, second, third, and fourth channel IR images 820 generated as described above. Here, the combination of the pixel values may be a mean, a weighted sum, or a simple sum of the pixel values, as non-limiting examples.

The test apparatus may generate a first intermediate image 850 through a combination 840 of pixel values of a pixel at the same position in the single-channel IR image 830 and the IR image 810. The combination of the pixel values may be a mean, a weighted sum, or a simple sum of the pixel values, as non-limiting examples. In an example, the test apparatus may perform normalization on the first intermediate image 850. For example, the test apparatus may transform the pixel values of the first intermediate image 850 such that the pixel values of the first intermediate image 850 is within a predefined or predetermined range.

The test apparatus may generate a second intermediate image 860 by performing normalization on the IR image 810. The test apparatus may generate the second intermediate image 860 by determining a maximum value and a minimum value among the pixel values of the IR image 810 and transforming the pixel values of the IR image 810 such that the pixel values of the IR image 810 are within a predefined range.

The test apparatus may generate a desired first preprocessed image 880 through a combination 870 of the first intermediate image 850, the second intermediate image 860, and the IR image 810. For example, the test apparatus may generate the first preprocessed image 880 by configuring pixel values of pixels at the same position in the first intermediate image 850, the second intermediate image 860, and the IR image 81, as three channels. Thus, each pixel of the first preprocessed image 880 may have a pixel value of a pixel at a corresponding position in the IR image 810, a pixel value of a pixel at a corresponding position in the first intermediate image 850, and a pixel value of a pixel at a corresponding position in the second intermediate image 860.

In an example, the first intermediate image 850 of FIG. 8A may be generated in a different manner. The test apparatus may generate the first intermediate image using an edge emphasis technique, for example, Canny, HOG, LBP, and/or Sobel. For example, as shown in FIG. 8B, the test apparatus may acquire an edge detection result image 825 from the IR image 810 using the Canny edge detection technique, and may generate a first intermediate image 855 through a combination 835 of pixel values of pixels at the same position in the edge detection result image 825 and the IR image 810. Then, the test apparatus may generate a desired first preprocessed image 885 through a combination 875 of the first intermediate image 855, the second intermediate image 860, and the IR image 810.

Figure 9:
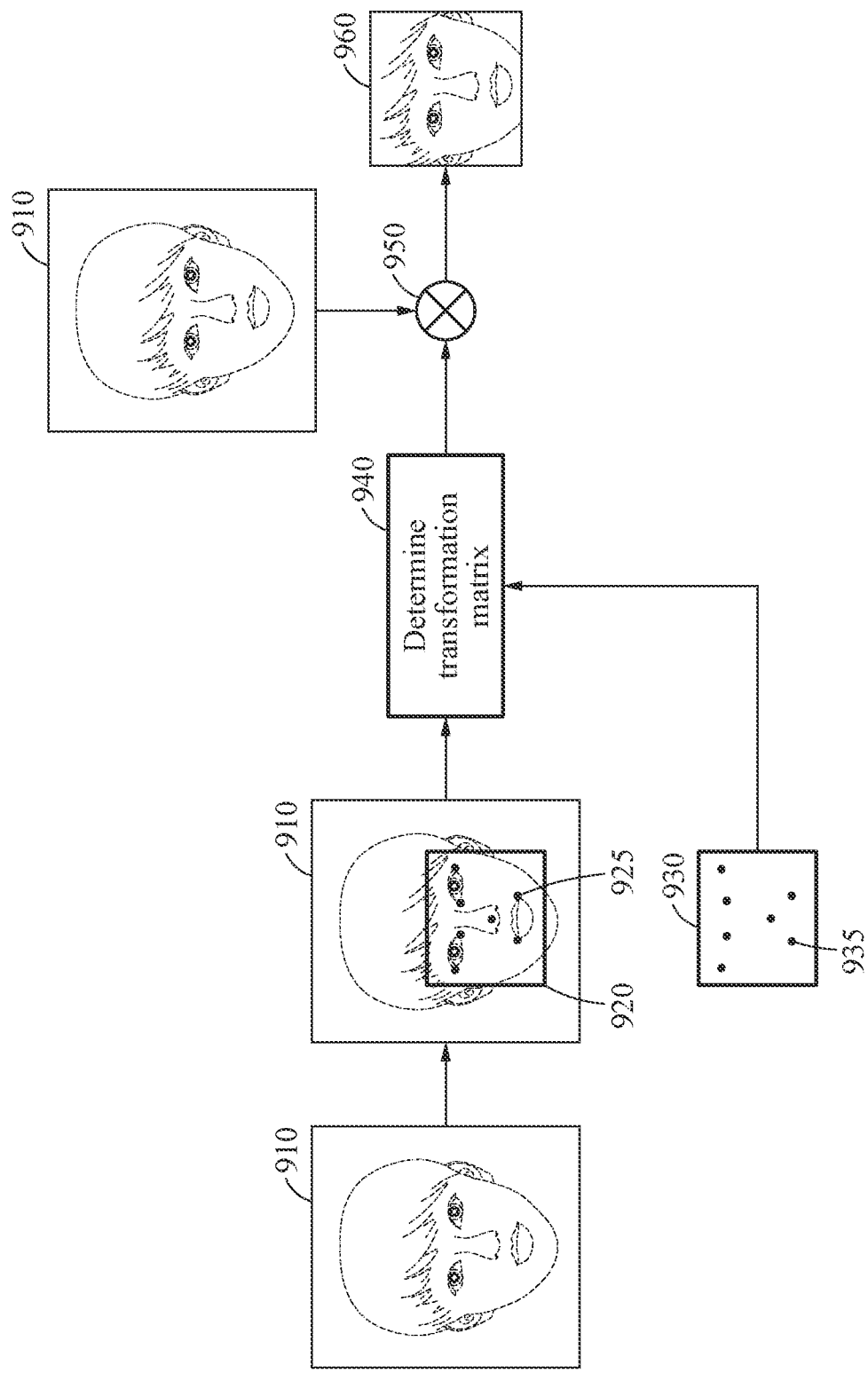
FIG. 9 illustrates an example of a second preprocessing process with respect to a depth image.

FIG. 9 illustrates an example of a second preprocessing process with respect to a depth image.

Referring to FIG. 9, the test apparatus may acquire a depth image in the form more appropriate for a liveness test or a biometric authentication through second preprocessing. First, the test apparatus may receive a depth image 910. The test apparatus may determine a face region 920 and feature points 925 of an object in the depth image 910 by mapping, to the depth image 910, a face region and feature points detected in an IR image corresponding to the depth image 910.

The test apparatus may determine a correspondence between the face region 920 and the feature points 925 of the depth image 910 and a predefined or predetermined face region 930 and reference points 935. In this example, positions of the reference points 935 may correspond to positions of endpoints of both eyes, a nose tip point, and/or both corner points of a mouth corresponding to a frontal face, as non-limiting examples. In operation 940, the test apparatus may determine a transformation matrix based on a positional relationship between the feature points 925 of the depth image 910 and the respectively corresponding reference points 935. The transformation matrix may be a translation and rotation matrix configured to perform at least one of a translation and a rotation of the object.

The test apparatus may generate a preprocessed depth image or second preprocessed image 960 in which a pose of the object is transformed through an application 950 of the determined transformation matrix to the depth image 910 or the face region 920 of the depth image 910. As a result of applying the transformation matrix, the object in the second preprocessed image 960 may be in a predefined or predetermined pose (for example, a frontal face pose).

Figure 10:
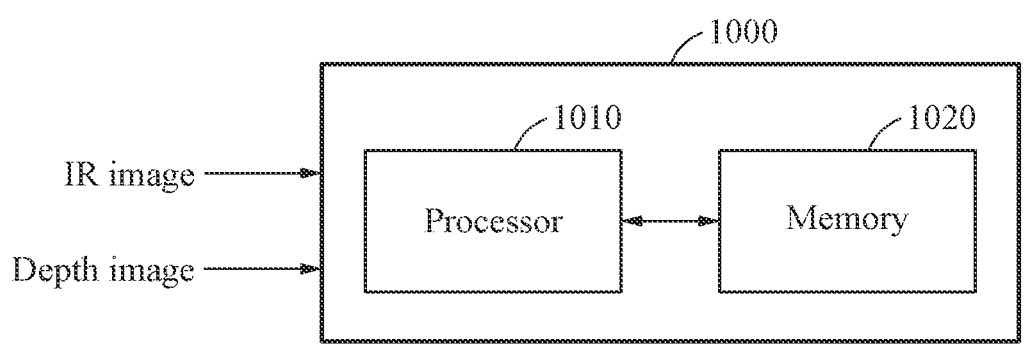
FIG. 10 illustrates an example apparatus with a liveness test.

FIG. 10 illustrates an example apparatus with a liveness test.

Referring to FIG. 10, a test apparatus 1000 may correspond to any of the test apparatuses described herein with respect to FIGS. 1-9 and may perform a liveness test and/or a biometric authentication based on an IR image and a depth image. The test apparatus 1000 may include a processor 1010 (e.g., one or more processors) and a memory 1020 (e.g., one or more memories). In an example, the test apparatus 1000 may further include one or more image sensors configured to acquire an IR image and a depth image.

The memory 1020 may be connected to the processor 1010 and may store instructions to be executed by the processor 1010, data to be computed by the processor 1010, or data processed by the processor 1010.

The processor 1010 may control the overall function and operation of the test apparatus 1000 and perform the one or more or all operations described above with reference to FIGS. 1 to 9. In an example, the processor 1010 may perform a liveness test with respect to an object based on the IR image and the depth image acquired by the one or more image sensors. The processor 1010 may generate a first preprocessed image in which an edge component is emphasized by performing first preprocessing with respect to the IR image. In addition, the processor 1010 may generate a second preprocessed image by performing second preprocessing with respect to the depth image. For example, the processor 1010 may determine feature points of the object in the depth image, and perform second preprocessing to transform the object shown in the depth image into a frontal face based on the determined feature points and reference points. The processor 1010 may determine a liveness of the object based on the first preprocessed image and the second preprocessed image. In an example, reference may be made to the description above of FIGS. 3 and 4 for further details.

In another example, the processor 1010 may perform a biometric authentication with respect to the object based on the IR image and the depth image acquired by the one or more image sensors. In this process, the processor 1010 may generate the first preprocessed image by performing first preprocessing on the IR image and generate the second preprocessed image by performing second preprocessing on the depth image, as described above. The processor 1010 may determine an authentication result with respect to the object based on the first preprocessed image and the second preprocessed image. Reference may be made to the description above of FIGS. 3 and 5 for further details.

The processor 1010 may generate a control signal based on the liveness test result or the biometric authentication result. For example, the processor 1010 may generate a control signal to determine to allow or block an access of the object or to reject or perform a request (for example, a request for execution of a predetermined function) from the object, based on the result.

Figure 11:
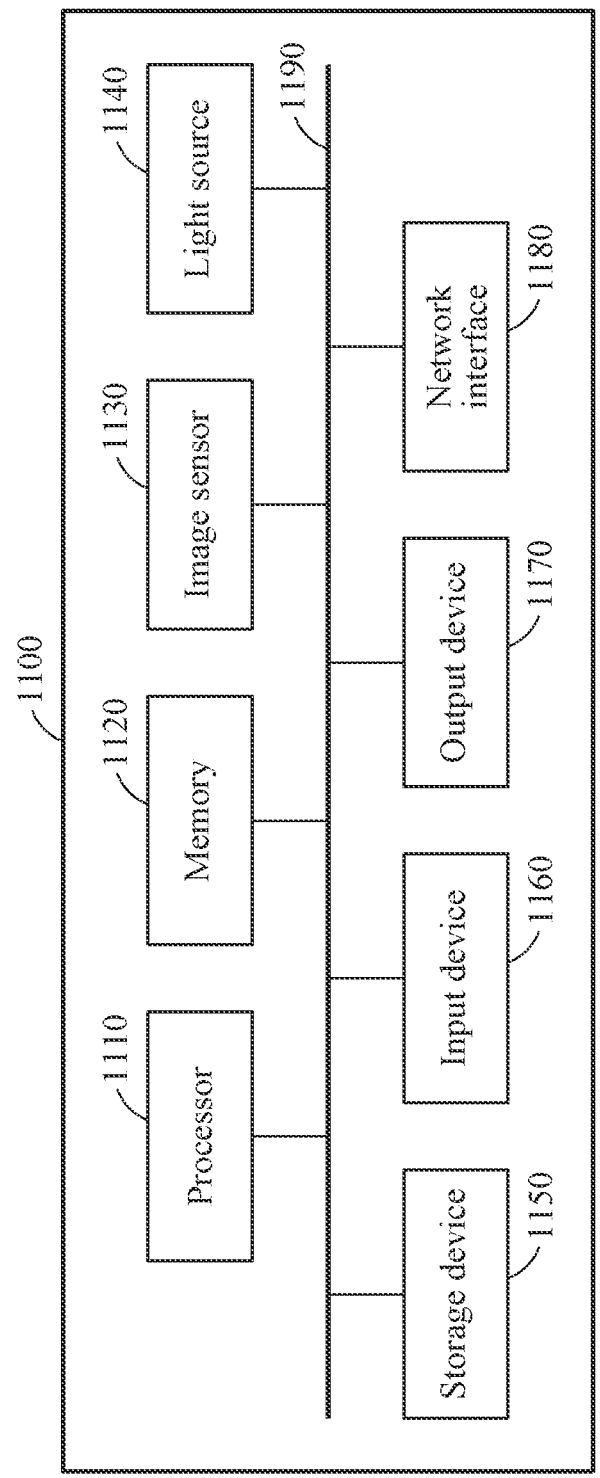
FIG. 11 illustrates an example electronic device with a liveness test and biometric authentication.

FIG. 11 illustrates an example electronic device with a liveness test and biometric authentication.

Referring to FIG. 11, an electronic device 1100 may correspond to any of the devices and apparatuses described herein with respect to FIGS. 1-10. The electronic device 1100 may include a processor 1110 (e.g., one or more processors), a memory 1120 (e.g., one or more memories), an image sensor 1130 (e.g., on or more image sensors), a light source 1140, a storage device 1150, an input device 1160, an output device 1170, and a network interface 1180. The elements of the electronic device 1100 may communicate with each other through a communication bus 1190.

The processor 1110 may execute instructions and functions to perform a liveness test and/or a biometric authentication. For example, the processor 1110 may process the instructions stored in the memory 1120 or the storage device 1150. The processor 1110 may perform the one or more or all operations described above with reference to FIGS. 1 to 10.

The memory 1120 may store information to be used to perform a liveness test and/or a biometric authentication. The memory 1120 may include a computer-readable storage medium or a computer-readable storage device. The memory 1120 may store necessary information and instructions to be executed by the processor 1110.

The image sensor 1130 may acquire an IR image including an object and a depth image including the object. In an example, the image sensor 1130 may include an IR camera configured to acquire an IR image and a depth camera configured to acquire a depth image. In another example, the image sensor 1130 may include a single image sensor, for example, an IR depth sensor and acquire the IR image and the depth image using the IR depth sensor.

The light source 1140 may radiate an IR ray under the control of the processor 1110. The light source 1140 may include, for example, at least one light-emitting diode (LED) and/or laser diode (LD) configured to project an IR ray. The light source 1140 may radiate an IR ray of a predetermined pattern, and when the IR ray of the predetermined pattern is reflected by an object, the reflected IR ray may be sensed by the image sensor 1130. Depth information of the depth image may be determined through a process of analyzing a reflection pattern when the radiated IR ray of the predetermined pattern returns by being reflected by the object.

The storage device 1150 may include a computer-readable storage medium or a computer-readable storage device. The storage device 1150 may store a more quantity of information than the memory 1120 and store the information for a relatively long time. For example, the storage device 1150 may include a magnetic hard disk, an optical disk, a flash memory, and/or a floppy disk.

The input device 1160 may receive an input from a user through a haptic, video, audio, and/or touch input. For example, the input device 1160 may include a keyboard, a mouse, a touch screen, a microphone, and/or any device configured to detect an input from a user and transmit the detected input to the electronic device 1100.

The output device 1170 may provide an output of the electronic device 1100 to the user through a visual, audio, and/or haptic channel, as non-limiting examples. The output device 1170 may include, for example, a display, a touch screen, a speaker, a vibration generator, and/or any device configured to provide an output to the user. The network interface 1180 may communicate with an external device through a wired or wireless network.

The apparatuses, test apparatuses, electronic devices, cameras, processors, memories, image sensors, light sources, storage devices, input devices, output devices, network interfaces, communication buses, electronic device 120, camera 130, test apparatus 1000, processor 1010, memory 1020, electronic device 1100, processor 1110, memory 1120, image sensor 1130, light source 1140, storage device 1150, input device 1160, output device 1170, network interface 1180, communication bus 1190, and other apparatuses, units, modules, devices, and other components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    generating a preprocessed infrared (IR) image by performing first preprocessing based on first feature points detected in a bounding region of an object included in an IR image;
    generating a preprocessed depth image by performing second preprocessing based on second feature points detected in a bounding region of the object included in a depth image, the second feature points being detected by matching positions of the first feature points detected in the IR image to the depth image; and
    determining whether the object is a genuine object based on the preprocessed IR image and the preprocessed depth image.

2. The method of claim 1, further comprising acquiring the IR image including the object, and acquiring the depth image including the object.

3. The method of claim 1, wherein the determining of whether the object is the genuine object comprises determining whether the object is an animate object.

4. The method of claim 1, wherein the generating of the preprocessed IR image comprises generating the preprocessed IR image such that an edge component of the IR image is emphasized in the preprocessed IR image, and
    wherein the edge component is an edge component of the object in the IR image.

5. The method of claim 1, wherein the generating of the preprocessed IR image comprises:
    generating the preprocessed IR image based on the IR image, a first intermediate image that is based on pixel values of a current pixel and neighboring pixels of the current pixel in the IR image, and a second intermediate image corresponding to a normalization of the IR image.

6. The method of claim 5, wherein a pixel of the preprocessed IR image includes a pixel value of the current pixel in the IR image, a pixel value of a pixel at a corresponding position in the first intermediate image, and a pixel value of a pixel at a corresponding position in the second intermediate image.

7. The method of claim 5, further comprising generating the first intermediate image by combining a pixel value of the current pixel in the IR image and a pixel value of a pixel at a corresponding position in a generated single-channel IR image,
    wherein the generated single-channel IR image is generated by combining a pixel value of a pixel at the corresponding position in a first channel IR image, a pixel value of a pixel at the corresponding position in a second channel IR image, a pixel value of a pixel at the corresponding position in a third channel IR image, and a pixel value of a pixel at the corresponding position in a fourth channel IR image.

8. The method of claim 7,
    wherein the pixel value of the pixel in the first channel IR image is a pixel value of a pixel positioned immediately above the current pixel in the IR image,
    wherein the pixel value of the pixel in the second channel IR image is a pixel value of a pixel positioned immediately below the current pixel in the IR image,
    wherein the pixel value of the pixel in the third channel IR image is a pixel value of a pixel positioned immediately to the left of the current pixel in the IR image, and
    wherein the pixel value of the pixel in the fourth channel IR image is a pixel value of a pixel positioned immediately to the right of the current pixel in the IR image.

9. The method of claim 1, wherein the generating of the preprocessed depth image comprises:
- determining, as included in the second feature points detected in the depth image, third feature points of the object in the depth image; and
- performing the second preprocessing by performing either one or both of a translation and a rotation of the object in the depth image based on the third feature points of the object.

10. The method of claim 1, wherein the generating of the preprocessed depth image comprises:
- determining, as included in the second feature points detected in the depth image, third feature points of the object in the depth image; and
- performing the second preprocessing by transforming the object in the depth image into a frontal face based on the third feature points of the object and reference points of a predetermined face region.

11. The method of claim 10, wherein the determining of the third feature points of the object comprises determining positions of the third feature points of the object in the depth image to correspond to positions of the first feature points, being of the object, detected in the IR image.

12. The method of claim 11, wherein the performing of the second preprocessing comprises:
- determining a transformation matrix based on the positions of the third feature points of the object in the depth image and corresponding positions of the reference points of the predetermined face region; and
- applying the determined transformation matrix to the object in the depth image.

13. The method of claim 1, wherein the determining of whether the object is a genuine object comprises:
- determining a first liveness score using a neural network-based first liveness test model that is provided the preprocessed IR image as an input;
- determining a second liveness score using a neural network-based second liveness test model that is provided the preprocessed depth image as an input; and
- determining whether the object is a genuine object based on the first liveness score and the second liveness score.

14. The method of claim 1, wherein the determining of whether the object is a genuine object comprises:
- determining a liveness score using a neural network-based liveness test model that is provided the preprocessed IR image and the preprocessed depth image as inputs; and
- determining whether the object is a genuine object based on the liveness score.

15. The method of claim 1, further comprising determining whether authentication of the object is successful based on the preprocessed IR image and the preprocessed depth image.

16. A non-transitory computer-readable storage medium storing instructions that, when executed by a processor, configure the processor to perform the method of claim 1.

17. The method of claim 1, further comprising:
- detecting the bounding region of the object included in the IR image before performing the first preprocessing; and/or
- detecting the bounding region of the object included in the depth image before performing the second preprocessing.

18. The method of claim 1,
- wherein the performing of the first preprocessing is based on the first feature points detected in the bounding region of the object, in a first pose, included in the IR image,
- wherein the performing of the second preprocessing includes performing a pose adjustment, to generate the preprocessed depth image, based on the second feature points detected in the bounding region of the object, in the first pose, included in the depth image, and
- wherein the first preprocessing includes a generation of feature enhancement information of the object included in the IR image.

19. A processor-implemented method, comprising:
- generating a preprocessed infrared (IR) image by performing first preprocessing based on first feature points detected in a bounding region of an object included in an IR image;
- generating a preprocessed depth image by performing second preprocessing based on second feature points detected in a bounding region of the object included in a depth image, the second feature points in the depth image being detected by matching positions of the first feature points detected in the IR image to the depth image; and
- determining whether authentication of the object is successful based on the preprocessed IR image and the preprocessed depth image.

20. The method of claim 19, wherein the generating of the preprocessed IR image comprises generating the preprocessed IR image such that an edge component of the object in the IR image is emphasized in the preprocessed IR image.

21. An apparatus, comprising:
- one or more image sensors configured to acquire an infrared (IR) image including an object, and acquire a depth image including the object; and
- a processor configured to:
  - generate a preprocessed IR image by performing first preprocessing based on first feature points detected in a bounding region of an object included in the IR image;
  - generate a preprocessed depth image by performing second preprocessing based on second feature points detected in a bounding region of the object included in the depth image, the second feature points being detected by matching positions of the first feature points detected in the IR image to the depth image; and
  - determine either one or both of a liveness test result and an authentication result with respect to the object based on the preprocessed IR image and the preprocessed depth image.

22. The apparatus of claim 21, wherein the processor is further configured to generate the preprocessed IR image such that an edge component of the object in the IR image is emphasized in the preprocessed IR image.

* * * * *